Aug. 15, 1967          H. P. RAABE          3,336,480
OPTICAL ROTATION SENSING SYSTEM FOR SPACE VEHICLES
Filed May 21, 1963          3 Sheets-Sheet 1
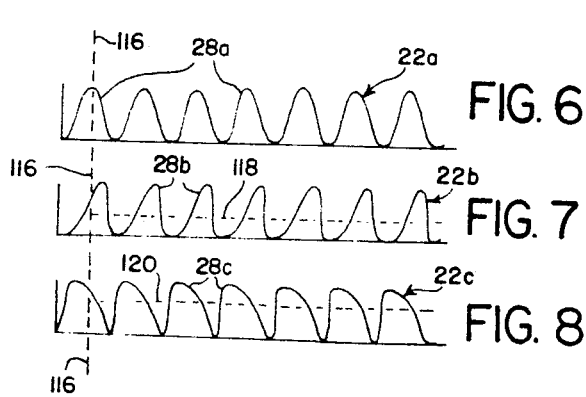
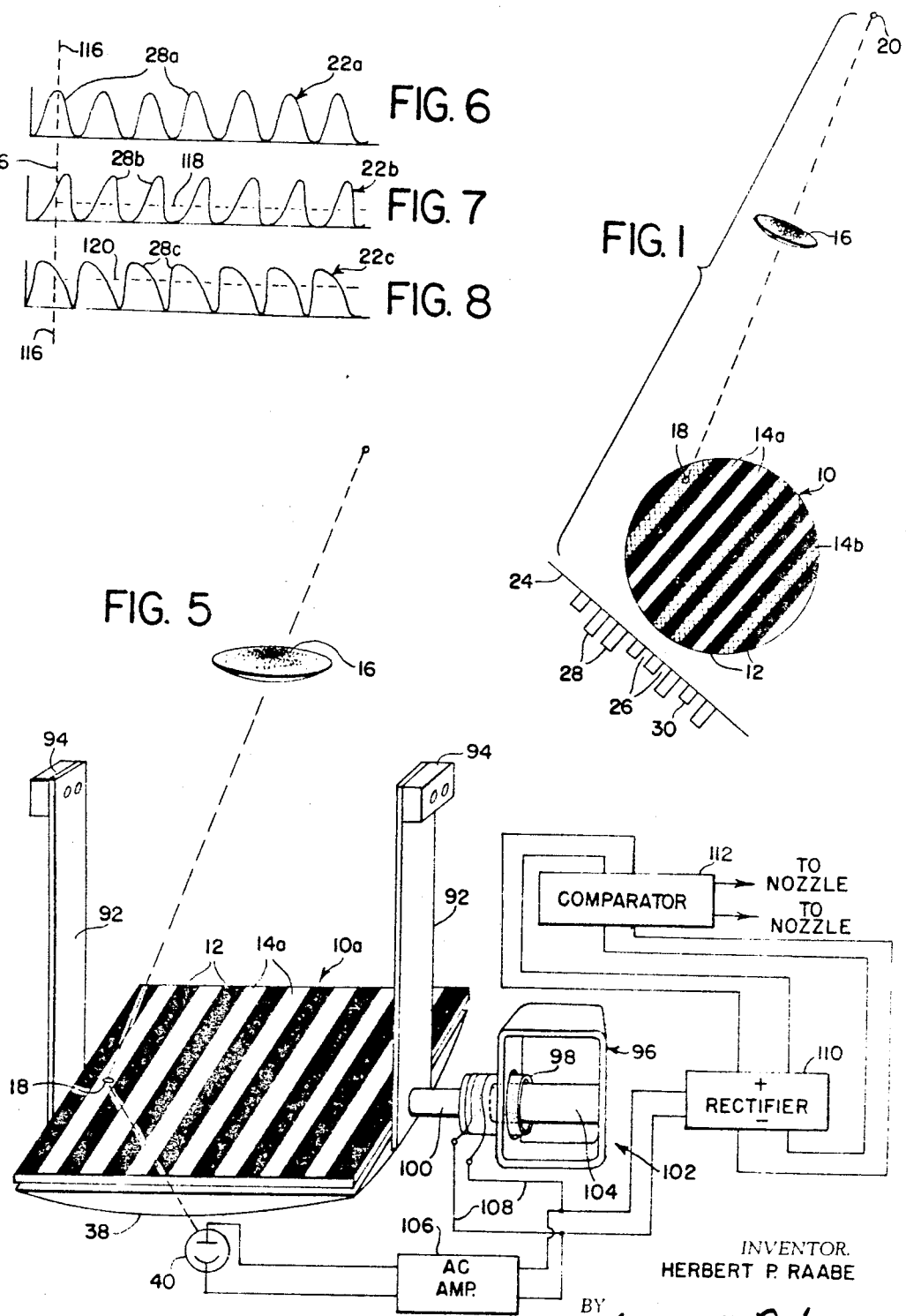
INVENTOR.
HERBERT P. RAABE
BY Stuart R. Peterson
ATTORNEY

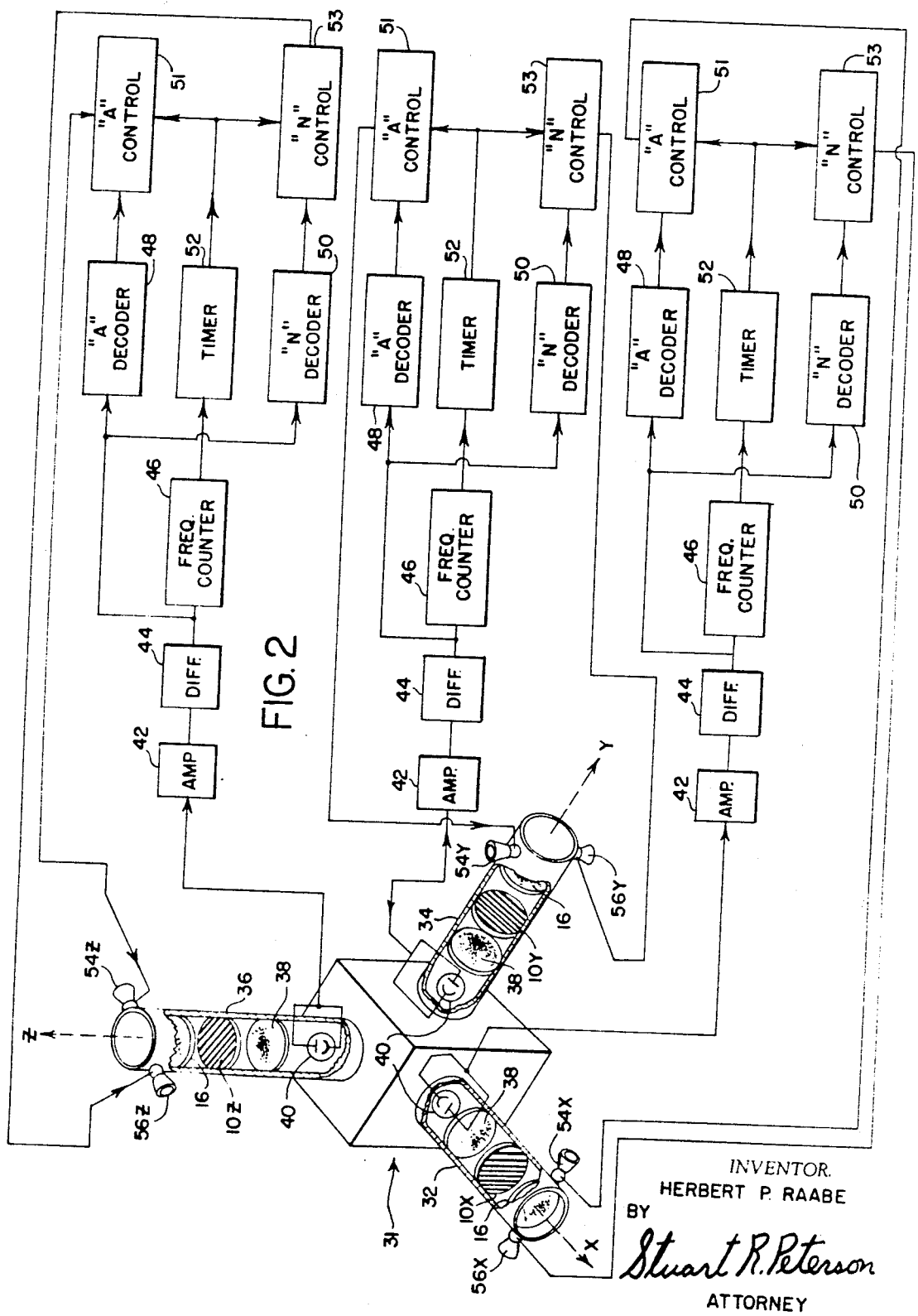

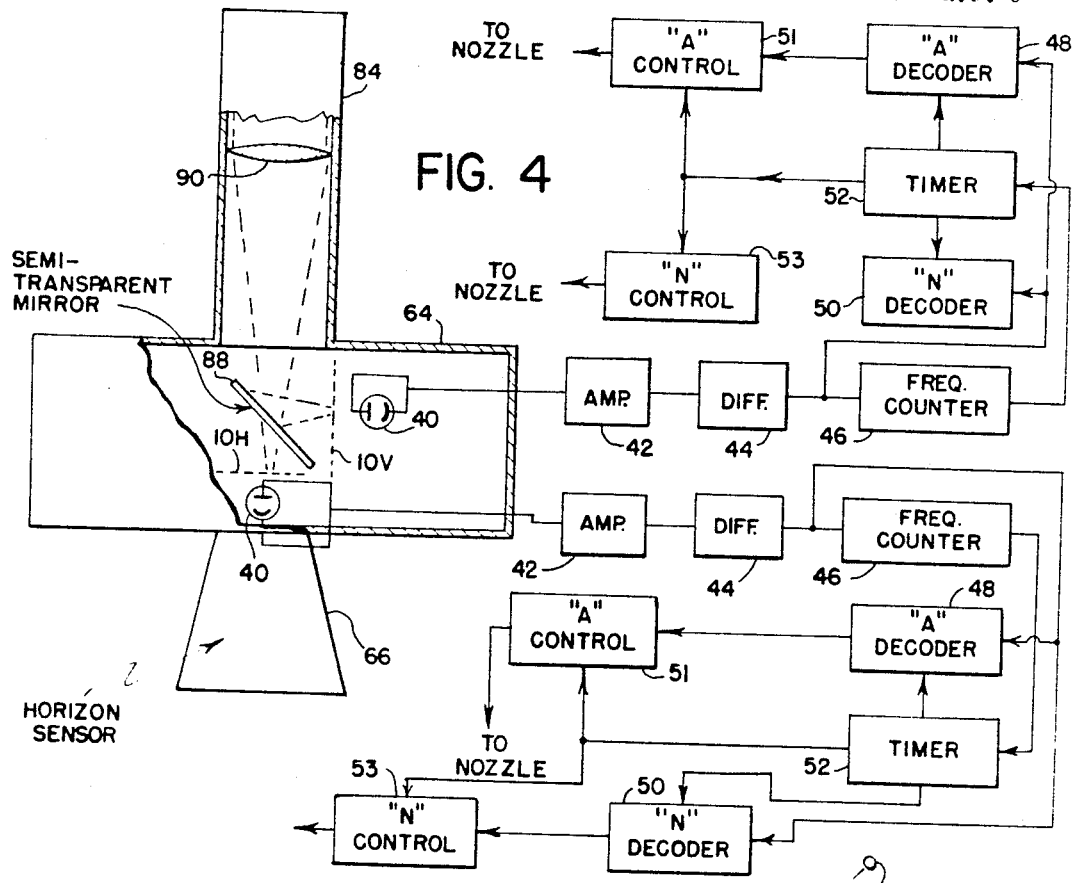

| United States Patent Office | 3,336,480
Patented Aug. 15, 1967 |
|---|---|

3,336,480
OPTICAL ROTATION SENSING SYSTEM FOR
SPACE VEHICLES
Herbert P. Raabe, St. Paul, Minn., assignor, by mesne
assignments, to Litton Systems, Inc., Beverly Hills,
Calif., a corporation of Maryland
Filed May 21, 1963, Ser. No. 282,091
15 Claims. (Cl. 250—203)

This invention relates generally to optical systems, and pertains more particularly to such a system for determining the rotation or spin of satellites and the like in space.

Satellites, unfortunately, tend to rotate about an arbitrary axis or axes after their separation from the launching rocket. In a number of instances, it is either required to determine the satellite attitude continuously or to determine the rotation in order to control a maneuver which leads to a stationary attitude or to a specific state of rotation which is best suited for the particular task of the satellite. For example, if the satellite carries an observatory to investigate distant stars, a stationary platform will be desired, whereas, on the other hand, a weather satellite should maintain a particular attitude with respect to the earth while in orbit.

Inertial devices have been proposed to fulfill this task. For example, two gimballed gyroscopes in orthogonal position would define a plane in space. Their disadvantages, however, will be immediately recognized. Not only are such gyros expensive, but they require bearings that do not work well under space conditions, even developing errors that increase with time.

Therefore, star trackers operating on an entirely different principle would be expected to be of some advantage, because their error remains extremely small. Two trackers would be required to define a plane in space, but trackers of the alluded to stellar type depend on the identification of the stars they are intended to track and additionally require a precision gimbal system. Thus, the complexity is high which is reflected in weight, cost and unreliability.

Accordingly, the present invention has for an object the provision of a sensing system, optical in character, that obviates the need for any mechanical moving parts. More specifically, the invention has for an aim the provision of an optical instrument capable of determining the changes in attitude of a satellite or other space vehicle with respect to a reference coordinate frame. Still further, the invention envisages the derivation of output signals from the instrument or sensor that will serve as appropriate attitude drive signals that can be applied to attitude drive devices, such as jet or plasma nozzles, in order to effect either a zero angular velocity or a controlled non-zero angular velocity.

Another object of the invention is to provide a system of the foregoing that will be long-lasting.

Another object is to provide an optical rotation sensing system for space vehicles that is both accurate and reliable. In this regard, it is planned that the grating or reticle utilized in the practicing of the invention be matched to the optical resolution of the lenses employed. Stated somewhat differently, the stripe spacing of the reticle can be selected so that if only a very small stellar image is available, then the stripe spacing can be correspondingly small.

A further object of the invention is to provide a sensing system that will not be expensive to produce.

Yet another object is to provide a sensing system capable of functioning with low power requirements.

In its basic form, the invention includes a reticle having parallel lines or stripes thereon which are spaced at distances approximately equal to the diameter of the stellar images to be used. By means of a photo detector, such as a photomultiplier tube, placed at the side of the reticle opposite the stellar background, a signal is produced via the photo detector having a frequency dependent upon the rate of rotation of the space vehicle carrying the sensing equipment. Through the use of a plurality of reticles and photo detectors arranged in different orthogonal planes, additional signals can be generated that are truly indicative of what is taking place in space as far as rotation or tumbling is concerned about certain axes. It is planned that these derived signals be utilized to initiate corrective action in order to achieve a preferred vehicle attitude.

These and other objects and advantages of the invention will more fully appear from the following description, made in connection with the accompanying drawings, wherein like reference characters refer to the same or similar parts throughout the several views and in which:

FIGURE 1 is a view of a reticle used in the practicing of the invention, the view also illustrating the variation in light passing through the reticle by reason of a coded arrangement of stripes;

FIGURE 2 is a combined perspective view of a space vehicle equipped with a trio of reticles shown in FIGURE 1 and a block diagram of the electrical circuitry utilized in the control of the vehicle's attitude;

FIGURE 3 is a view of another space vehicle, this vehicle being equipped with a horizon sensor and a pair of reticles similar to the one shown in FIGURE 1;

FIGURE 4 is a sectional view showing the detailed use of the two reticles of FIGURE 3 plus a block diagram of the circuitry associated therewith;

FIGURE 5 is a rather diagrammatic view of a modified construction my invention may assume in which unsymmetrical waveforms with respect to time are produced and utilized in obtaining a change in satellite attitude;

FIGURE 6 illustrates a symmetrical waveform that is helpful in describing FIGURE 5;

FIGURES 7 and 8 illustrate typical unsymmetrical waveforms that are employed in effecting a desired directional change in attitude with the system pictured in FIGURE 5.

In order to provide a basic understanding of the invention, it will be helpful to refer first to the simplified disclosure of FIGURE 1. This figure shows a reticle 10 comprised of parallel stripes, more particularly, opaque stripes 12 and light transmissive stripes 14. Actually, for direction determining reasons, the light transmissive stripes are composed of some transparent stripes and some that are only translucent, the transparent stripes having been distinguished by the suffix *a* and the translucent stripes by the suffix *b*. More will be said as the description progresses concerning the role played by the stripes 12, 14a and 14b. Although not shown in this figure, the reticle 10 is carried on a space vehicle. In the highly schematic arrangement depicted in FIGURE 1, a lens 16 forms an image 18 of a star 20 on the striped surface of the reticle 10. The width and the spacing of the stripes 12, 14a and 14b, it will be understood, is preferably equal and should not be narrower than the size of the smallest image to be picked up. The size of the image may depend on the detail of the observed objects but in most cases, it is limited by the resolving power of the lens. Therefore, the angular motion of the star 20 will cause the image 18 to move across the reticle 10 and light passing through the stripes 14a and 14b will be modulated periodically due to the velocity component normal to the direction of the stripes.

Because the stripes 12 are opaque, the stripes 14a transparent and the stripes 14b translucent, the stripes 12 will pass no light, the stripes 14a a maximum amount, and the stripes 14b a moderate amount. Although a photocell or photo detector has not been illustrated in FIGURE 1, a typical modulated waveform 22 has been placed adjacent to the reticle 10. In this regard, it will be observed that waveform 22 deviates from a base line 24, there being no excursions from said base line 24 at locations 26 where no light passes through the reticle 10, this being due to the opaque stripes 12, maximum excursions or pulses 28 where the light passes through the transparent stripes 14a and medium excursions or pulses 30 where the light is transmitted through the stripes 14b.

From the above-presented description, it will be recognized that a code system has been incorporated into the reticle 10 by reason of the unsymmetrical stripe pattern. The purpose of this is to provide convenient information on direction. Those familiar with the well-known Morse code system will immediately perceive that the code represents an A or N depending upon the direction of passage of the image 18 across the reticle 10. More will be stated hereafter concerning the practical use to which this coding scheme is put.

Assuming that complete stabilization of a space vehicle is desired, the embodiment of FIGURE 2 would be selected. When considered in conjunction with FIGURE 1, this embodiment should be readily understood. The space vehicle of FIGURE 2 has been denoted in its entirety by the reference numeral 31. In order to present a complete definition of the space vehicle rotation with respect to the stellar background, three telescopes 32, 34 and 36 are fixedly mounted on the vehicle in such a way that each points in the direction of one of three orthogonal axes which have been labelled X, Y and Z. Inasmuch as each telescope includes a reticle 10 and since these reticles are each oriented differently as far as its stripe pattern is concerned, the reticle of the telescope 32 has been distinguished by the suffix x, the reticle of the telescope 34 by the suffix y and the reticle of the telescope 36 by the suffix z. While a more complex lens system would be used in practice, nonetheless the single lens 16 has been included in each of the telescopes 32, 34 and 36. The lens 16 in each instance forms an image, such as the image 18 of FIGURE 1, on the reticles 10x, 10y and 10z. Through the agency of a field lens 38 closely associated with each telescope the light passing through the transparent and translucent stripes (see the stripes 14a and 14b of FIGURE 1) are focussed onto a photo detector 40 such as a photomultiplier tube. Actually, the field lenses 38 are much closer than pictured to the reticles 10x, 10y and 10z, and are shown farther away for drafting clarity.

Since photomultiplier tubes are well known, the specific electrical connections have not been depicted. However, it can be simply explained that the tube 40, in each instance, is connected to an amplifier 42, the output of which is forwarded to a differentiator 44. The differentiated signal is then fed to a frequency counter 46. Consequently, whereas the signal from the photo tube 40 includes both A-C and D-C components, the signal delivered to the frequency counter constitutes only an A-C signal, the peaks of which are readily counted to provide an indication of the rate of rotation or spin about the various orthogonal axes.

From FIGURE 1, it will be recalled that the stripe pattern of the reticle 10 is unsymmetrical for the purpose of determining the direction of rotation or spin. The code provided by the stripes 12, 14a and 14b has already been stated to be an A or N depending upon which direction the stellar image is moving across the striped reticle. Accordingly, two decoders 48, 50 are connected into the circuit at the input side of each counter 46, one being a decoder operable by the A code and the other by the N code.

Connected to each counter 46 is a timer 52 that is operated in accordance with the count determined by the frequency counter which count is of course indicative of the number of stripes 12, 14a and 14b (not necessarily all of the stripes, though) traversed by the stellar image 18. More specifically, the first pulse from a transparent stripe 14a or translucent stripe 14b will turn on or start the timer 52 in each instance and a predetermined pulse thereafter will turn off or stop the timer, this being of course after a predetermined number of counts has been reached. Thus, the timer will indicate the elapse of a short period of time if the counts arrive at a rapid rate and vice versa. Each timer 52 and A decoder 48 is connected to what will be termed an A control circuit 51, and each timer 52 and N decoder 50 is connected to an N control circuit 53. The purpose of the control circuits 51, 53 is to put out a control signal that is inversely proportional to the time measured by the timer 52 and only if its particular decoder 48 or 50 has been activated by the proper code. The signals from the control circuits will be for a longer period of time when the image is moving across any of the reticles 10x, 10y, 10z at a fairly fast rate and will be for a shorter period when the image is moving more slowly.

To achieve the stabilization, a plurality of nozzles are appropriately mounted on the vehicle 30. These nozzles have been designated at 54x, 56x, 54y, 56y and 54z, 56z. If of the jet fluid type, such as those utilizing hydrogen peroxide, then the signals from the control circuits 51, 53 would simply energize those solenoids associated with the particular nozzles that should be activated to cause the attitude correction or reorientation. In this situation, the jets would be turned on full blast, but the duration of the signal would govern the amount of corrective action. When ion jets are used, then the degree of plasma ionization would be controlled by the signals from the circuits 51, 53.

As a specific operational example, we can assume that the space vehicle is rotating or spinning in the x–z plane. Consequently, a stellar image would be passing only across the reticle 10z. This would cause a modulated signal to be produced by the photocell 40 associated with the telescope 36. The photocell would therefore produce a signal similar to the waveform 22 appearing in FIGURE 1.

Such a signal would be amplified at 42, differentiated at 44 and the frequency thereof would be counted at 46. Further assuming that the image first passes over an opaque stripe 12, then a translucent stripe 14b, then a second opaque stripe, then a first transparent stripe 14a, then another opaque stripe, then another transparent stripe, this being the course of events taking place when the image moves across the reticle in a manner similar to a left to right travel in FIGURE 1, a particular pulse pattern is produced. Of course, FIGURE 1 is intended to explain the general concepts and the reticle 10z of FIGURE 2 is not oriented in the same position. However, it should be obvious, as far as the pulse pattern is concerned, that a medium-sized pulse 30 would first be produced, then two full-sized pulses 28, then two more medium-sized pulses 30, then another pulse 28, another pulse 30 and finally another pulse 28. This would be recognized as an A code by the decoder 48 associated with the telescope 36 which would thereby cause actuation of the nozzle 54z via its control circuit 51 to prevent further spinning or tumbling of the space vehicle in a clockwise direction about the y axis shown in FIGURE 2.

For the sake of simplicity, it has been assumed that the space vehicle is rotating or spinning only in the x–z plane. Consequently, the image has moved across the reticle 10z and the light passing therethrough has been modulated periodically due to the velocity component that is normal to the direction of the stripes 12 and 14, there being no other component under these assumed conditions. However, it will be appreciated that when other components are involved, whether in conjunction with the reticle 10z or the other reticles 10x, 10y, the particular sensing devices 40 will provide signals of a character that when processed by the various components 42–53 will produce the proper control signals for operating the necessary nozzles 54x, 56x, 54y, 56y, 54z, 56z to achieve a stabilized state of the vehicle 31.

It might be pointed out that the positioning of the three telescopes 32, 34 and 36 does not have to be along the three orthogonal axes $x$, $y$ and $z$. The only significant requirement is the positioning in three orthogonal planes which are defined by the velocity vectors of maximum frequency response. For example, the instrument comprising the telescope 32, which is sensitive to rotation about the $z$-axis due to the direction of the stripes on the reticle 10x, could be placed anywhere within the $x$–$y$ plane. By the same token, the telescope 34 could be placed anywhere within the $y$–$z$ plane and the telescope 36 anywhere within the $x$–$z$ plane. Consequently, two telescopes could be positioned along the same axis while the third must be mounted in an orthogonal direction. For instance, the telescopes 32, 34 (serving as $x$ and $y$ meters) could be combined in a coaxial unit positioned along the $y$-axis. Thus, only one lens 16 would be required if a semitransparent mirror is used to produce two images in the manner now to be described.

In some space applications, rotation about a specific axis is desired in order to provide a specific orientation with respect to the earth. A ground reconnaissance or weather satellite would be an example of such an application; certain antenna systems would also demand that a portion thereof always face the earth. In such a situation, the rotational axis could be assumed in any position with respect to $x$–$y$–$z$ coordinates and from the output frequencies of the three photo detectors a corrective program can be initiated just as in the embodiment of FIGURE 2 where complete stabilization is required. It can be appreciated that in FIGURE 2 there will be an axis of rotation where the frequencies picked up by the photocells 40 will all be equal; on the other hand, if the rotation is about, say, the $y$-axis (as was assumed in the operational description pertaining to FIGURE 2), then the detector 40 (the one associated with the telescope 36) for that axis will pick up the maximum frequency and the other two detectors will give a zero frequency reading. This explanation may be helpful in understanding FIGURES 3 and 4.

With reference to FIGURES 3 and 4, a space vehicle in the form of a satellite 60 (FIGURE 3) is illustrated in this embodiment, the satellite to be considered as orbiting the earth 62. For the sake of discussion, it can be assumed that the satellite 60 is monitoring weather conditions and that a specific orientation should be maintained. With this in mind, a housing 64 is fixedly mounted on the nose of the satellite which carries a horizon sensor 66 designed to seek the edge of the earth 62 by means of infrared radiation. Although the details of the sensor 66 are not shown, it will be appreciated that the various detectors comprising the sensor 66 control a plurality of nozzles 68–78. With respect to the nozzles 68, 70, it will be appreciated that an identical pair of such nozzles are on the opposite side of the satellite and are therefore not visible. Thus, the sensor 66 is responsible for initially lining up the satellite 60 so that the sensor 66 is in effect sighted on point $c$ on the earth 62.

Reference is now made to a telescope 84 associated with the housing 64, which is viewing a star 86. From the information given hereinbefore, it can be understood that with a single reticle 10, such as that pictured in FIGURE 1, oriented so that its stripes are normal to the orbital plane and with the longitudinal axis of the satellite 60 residing in its orbital plane, then the image of the star 86 would traverse the reticle in a direction normal to said stripes and would produce a modulated signal having a maximum frequency. However, the longitudinal axis of the satellite will not stay in the orbital plane but will twist to either side. This rotative drift produces a slant of the reticle relative to the orbital plane, because the reticle is fixedly mounted on the satellite and rotates therewith.

To detect the slant of the star tracks formed in FIGURE 3, a system of reticles is utilized. The pair of reticles depicted schematically in FIGURE 4 have been labelled 10$v$ and 10$h$, the former being disposed in a vertical plane and the latter in a horizontal plane with the stripes being at 90 degrees with respect to each other. In other words, the stripes extend diagonally at 45 degrees to a horizontal line passing through a mirror labelled 88.

The mirror 88, which is semitransparent, is mounted on an angle within the housing 64 for splitting the light from the star 86 which passes through a lens 90 before striking said mirror. More specifically, the semitransparent mirror 88 is disposed at a 45 degree angle with respect to the reticles 10$v$ and 10$h$ so as to provide two images, one of which is formed on the reticle 10$v$ and the other of which is formed on the reticle 10$h$.

As with FIGURE 2, the reticle-modulated light is picked up by a photo detector associated with each reticle 10$v$ and 10$h$. Inasmuch as the photo detectors in this instance perform the same function as those in FIGURE 2, they have also been assigned the reference numeral 40. Likewise, the amplifiers, differentiators, frequency counters, decoders and timers also play the same role and have been numbered to correspond to those appearing in FIGURE 2. Still further, it will be recognized that the decoders 48, 50 and control circuits 51, 53 of FIGURE 4 are intended to supply control signals to the nozzles 68, 70, 80, 82 in the same manner as signals were transmitted to the nozzles in FIGURE 2.

From the preceding description of FIGURES 3 and 4, it will be apparent that the use of the two reticles 10$v$ and 10$h$, in effect oriented at +45 degrees and −45 degrees with respect to a given axis, avoids any frequency determination on an absolute basis. What takes place in operation is that instead of making an absolute frequency determination, a differential system is provided in this embodiment, thereby virtually eliminating all errors (other than directional), even though small, that would be present if only a single reticle were employed. By having the reticle stripes correspond to those of the reticle 10 shown in FIGURE 1, that is, as far as opaqueness, transparency and translucency are concerned, then the system is also made sensitive to direction as previously explained in conjunction with FIGURES 1 and 2.

Consequently, after the horizon sensor has initially oriented the satellite 60, then the signals derived from the reticles 10$v$ and 10$h$ are instrumental in maintaining a particular attitude of the satellite 60 with respect to the earth 62 as it orbits.

It has already been explained that the pattern of transparent and translucent stripes 14$a$ and 14$b$, together with the intervening opaque stripes 12, provides a code that is direction sensitive. While such a code is designed to work satisfactorily where only one stellar image impinges on the reticle 10 at any given time, such a coded system or plan does not work well for a multiplicity of star images due to the random timing of the modulation code. Code deterioration and likely misinterpretation results because when a star passes over a coded reticle, the signal picked up by any of the photocells 40 will be in accordance with the pulse pattern or waveform 22, indicating either an A or N depending upon direction of image movement. By adding a large number of coded signals at random times due to a plurality of images, their spectral components naturally are at random phases. Therefore, the time function shows no similarity with that of the contributing signals. Even a matched filter has no better chance that 0.5 to pick the right code.

The solution about to be described in detail is based on the fact a motion of the reticle with respect to the motion of the star image causes a phase or frequency modulation. This results in a code which does not deteriorate with the number of stars because the code has the same timing on all star signals and not a random timing, as in the case of the transparent code embodied in the reticle 10 of FIGURE 1. As the relative speed of the star image with respect to the reticle determines the frequency of the light modulation, a motion of the reticle in the direction of the motion of the image will result in a lower frequency, while motion in an opposite direction results in a higher frequency.

In the arrangement shown in FIGURE 5, a reticle 10a is utilized which contains only opaque stripes 12 separated by transparent stripes 14a, the translucent stripes 14b of FIGURE 1 being omitted. The reticle 10a is suspended by a pair of leaf springs 92 which are fixedly supported at their upper ends to members 94 which are in practice spaced portions of the satellite itself. At any rate, it will be discerned that the reticle 10a can oscillate in a direction normal to the grid orientation. An electrodynamic drive mechanism is provided for the purpose of producing oscillations of the reticle 10a in a manner presently to be set forth. This mechanism 96 includes a coil 98 carried on an arm 100 that in turn is mounted to the reticle 10a. Also included in the mechanism 96 is a magnet assembly 102 having a permanent magnet 104 which projects into the coil 98, so that the coil 98 will move in accordance with the energization thereof.

Continuing with the description of FIGURE 5, it will be noted that a gain controlled alternating current amplifier 106 serves to amplify the signal picked up by the photocell 40, which amplified signal is fed to the coil 98 via conductors 108. The output from the amplifier 106 is also delivered to a rectifying means 110 and the resulting positive and negative signals are fed to a comparator 112 which in turn provides suitable actuating signals for a pair of nozzles, such as those labelled 54x, 56x or 54y, 56y or 54z, 56z of FIGURE 2, or other attitude control devices.

Having mentioned the foregoing components that are depicted in FIGURE 5 the operation thereof will now be given. Although for the sake of simplicity the waveform 22 of FIGURE 1 has been depicted as constituting various rectangular pulses 28 (and also pulses 30), these pulses do not actually have the initial square wave configuration that has facilitated their earlier description; although the rectangular characteristics are easily obtainable by differentiation and hard limiting techniques.

In FIGURE 6, a waveform 22a has been illustrated which is an unmodulated sine function. It will be helpful to visualize the reticle 10a of FIGURE 5 as being immobile for the moment with respect to the satellite on which it is intended to be carried. Consequently, movement of the satellite relative to the star 20 will cause the image 18 to traverse the reticle 10a. Assuming that the stripes 12 and 14a have approximately the same width as the image 18, it will be seen that when the image 18 starts to move from an opaque stripe 12 toward a transparent stripe 14a, there will be at first only a small amount of light passing through the reticle onto the photocell 40. The star light is periodically chopped and the photocell 40 onto which the transmitted light is directed registers the periodical waveform 22a consisting of a D-C component and A-C components of a harmonic spectrum. Because of the circular shape of the star image, only the first harmonic makes a significant contribution. The frequency of this sinusoid is a proportional measure of the rotational rate of the space vehicle. If a large number of stars passes over the reticle 10a, each one generates a D-C component and a sinusoidal wave of arbitrary phase. The sum of these signals, as registered by the photocell 40, consists of a D-C and an A-C component, but the A-C component does not build up as rapidly as the D-C component. In the A-C amplifier 106, the D-C component is rejected and the frequency is derived by measuring the time for a specified number of cycles which corresponds to the number of stripes 12, 14a to be crossed by a star during one transit, the number in this instance having, for the sake of simplicity, been chosen as eight stripes 12 and seven stripes 14a.

Owing to the circular configuration of the image, though, the continued advancement will cause more and more light to strike the cell 40 with the maximum impingement occurring when the image 18 is centered between two opaque stripes 12. By the same token, the least amount of light strikes the photocell 40 when the image 18 is centered between two transparent stripes 14a, for then the opaque stripe 12 therebetween completely blocks the light. Hence, it is believed readily apparent that the resulting waveform 22a has a symmetrical appearance, its sinusoidal pulses 28a having a balanced appearance with respect to a vertical line 116 extending through the peak of any given pulse.

Now, supposing, however, that we consider the stellar image 18 to be moving from left to right, as viewed in FIGURE 5, then the light modulation that ensues as a result thereof produces the waveform 22b illustrated in FIGURE 7. To explain the waveform 22b, we begin with the initial condition that the image 18 is obscured by the first opaque stripe 12 at the left so that the voltage of the photocell 40 is zero. As the star image moves over the edge of this first opaque stripe 12, the voltage builds up in the photocell 40 due to the increase in light impinging thereon and a current is fed from the amplifier 106 into the coil 98 to pull the reticle 10a in the direction of the motion of the image, thus keeping most of the image obscured. Consequently, the voltage cannot build up as fast as in the unmodulated case resulting in the waveform 22a.

As the elastic restoring force of the reticle 10a furnished by the leaf springs 92 increases, the point will soon be reached where all light of the star image 18 is transmitted and the corresponding current in the coil 98 reaches a maximum. This corresponds to the peak of the first pulse or wave labelled 28b of the waveform 22b. It will be perceived that the peak is delayed with respect to the peak of the unmodulated sine function or pulse 28a of the waveform 22a, the line 116 helping to emphasize the existence of this delay. This delay amounts to about a quarter cycle, which means that the reticle 10a was displaced by a quarter of the period of the reticle.

As the star image continues to advance, partial obscuration of the light by the second opaque stripe 12 takes place, so that the current in the coil 98 drops and the reticle 10a begins to move back, that is, toward the left. Such motion, however, causes further obscuration to take place, so that the voltage drops faster than in the unmodulated situation, this being evidenced by the waveform 22b. By the time the light is fully blocked, the reticle 10a will have returned to its rest or original position from which position the second cycle begins.

The stabilization of the coil current by automatic gain control is important since too weak an effect will not create a marked distortion of the waveform with respect to the line 116, while too strong an effect can lead to instabilities when the returning reticle moves so far as to admit light through the next transparent stripe 14a which would cause the coil 98 to pull again. As this would result in the light being progressively obstructed again, oscillation at the reticle suspension frequency could result. To prevent the reticle 10a from deflecting too far, a mechanical stop (not shown) can be employed. It is also important to have the resonance frequency occur quite a bit higher than the highest chopping frequency, this being readily achieved by using sufficiently stiff springs 92. Thus, the deflection amplitude will remain proportional to the coil current within the operating frequency range. Further stabilization of the system pictured in FIGURE 5 can be accomplished, if desired, by limiting the pass band of the A-C amplifier 106 to the operating frequency range.

To complete the description, the movement of the star image 18 from right to left, such a discussion illustrating how the embodiment of FIGURE 5 is truly direction sensitive, will now be described. The initial condition exists when the image 18 is obstructed by the opaque stripe 12 farthest to the right, for then no voltage is developed and the reticle 10a remains in its rest position. As the image 18 moves onto the adjacent transparent stripe 14a, though, current in the coil 98 is built up and the reticle 10a is pulled to the right so as to pass even more light to the photocell 40. Thus, the voltage, as shown in waveform 22c of FIGURE 8 builds up faster than the unmodulated voltage represented by waveform 22a. Soon, full light of the star image 18 is transmitted, and the reticle 10a is deflected one quarter of the period of the reticle to the right. As the image 18 proceeds farther to the left, light becomes obscured by the next opaque stripe 12. This causes the coil current to fall off and the reticle 10a follows the image, the more gradual voltage decrease being shown in the waveform 22c.

Comparison of the waveforms 22b and 22c reveals that the waves are unsymmetrical, the presence of the line 116 passing through the first pulse or wave of the curves 22b and 22c making this dissimilarity more readily discernible. The A-C amplifier 106 delivers either waveform 22b or 22c without the D-C components, which have been indicated by the dashed lines 118 and 120, respectively. Thus, curve 22b shows higher peaks on the positive side, while curve 22c shows higher peaks on the negative side. If one were to rectify the wave in either instance and derive a direct current from the positive portion, and also derive a direct current from the negative portion, these two currents would be in perfect balance because the areas of these two portions are equal. If, however, the rectifiers used to rectify the voltage signals represented by the waveforms 22b and 22c are biased by a voltage which is smaller than the peak voltage, the areas exceeding this bias are decidedly different; consequently, the two direct currents are unbalanced. The rectifying means 110 is biased in the foregoing manner. The current exceeding the positive bias and the current below the negative bias are balanced in the comparator 112. The output signal is, therefore, either a positive direct current or a negative one depending on the direction the star image 18 (or images, as the case may be) is (or are) moving.

A strictly electronic operation embodying the principle of the direction sensor is possible if one leaves the reticle 10a stationary with respect to the satellite and instead deflects the light beam by means of a prism (not shown) whose refractive index can be changed slightly when exposed to an electric field. A suitable material for such a prism is cuprous chloride, which exhibits a transverse electro-optic effect. Stated somewhat differently, the index of refraction changes under the influence of a transversely applied electric field. This field would, of course, be supplied by the output voltage of the A-C amplifier 106.

It will, of course, be understood that various changes may be made in the form, details, arrangements and proportions of the parts without departing from the scope of the invention as set forth in the appended claims.

What is claimed:

1. An optical rotation sensing system for space vehicles comprising:
   a space vehicle;
   telescope means fixedly mounted on said vehicle so as to be movable therewith;
   a reticle adjacent to said telescope means and being composed of optically distinguishable parallel stripes for passing and blocking light from a stellar image traversing said reticle;
   detecting means responsive to the movement of a stellar image across said reticle for producing a pulsating electrical signal in accordance with the velocity component of said image that is normal to the direction of said stripes; and
   means responsive to each pulse of said pulsating electrical signal for shifting said reticle in a selected direction to vary the waveform of said electrical signal according to the direction of the traverse of said stellar image.

2. A sensing system in accordance with claim 1 including:
   means responsive to the varied waveform for producing one signal when said waveform is of one type due to image traverse in one direction and for producing a different signal when said waveform is of a different type due to image traverse in an opposite direction.

3. An optical rotation sensing system for space vehicles comprising:
   a space vehicle;
   first, second and third reticles each having parallel opaque and light transmissive stripes constituting a coded pattern,
   said first reticle being oriented so that the stripes thereon are perpendicular to one orthogonal plane,
   said second reticle being oriented so that the stripes thereon are perpendicular to a second orthogonal plane,
   said third reticle being oriented so that the stripes thereon are perpendicular to a third orthogonal plane, and
   a detecting means for each reticle, each of said detecting means being responsive to the movement of a stellar image across its reticle for producing a coded electrical signal in accordance with the velocity component of said image that is normal to the direction of the stripes of its said reticle, each of said coded signals being indicative of the speed and direction of movement of the corresponding said velocity component across the corresponding said reticle.

4. A sensing system in accordance with claim 3 including:
   means responsive to said coded electrical signals for stabilizing said vehicle in space.

5. An optical rotation sensing system for space vehicles comprising:
   a space vehicle;
   three telescopes fixedly mounted on said vehicle and each telescope residing in a different orthogonal plane;
   a reticle for each of said telescopes having parallel alternate opaque and transparent stripes constituting a coded pattern and arranged in a direction normal to the orthogonal plane of the telescope with which it is associated; and
   a detecting means for each reticle responsive to the movement of a stellar image across its reticle for producing a coded electrical signal in accordance with the velocity component of said image that is normal to the direction of said stripes, each of said coded signals being indicative of the speed and direction of movement of the corresponding said velocity component across the corresponding said reticle.

6. A sensing system in accordance with claim 5 including:
   means connected to each of said detecting means and responsive to said coded electrical signals for providing corresponding corrective electrical signals.

7. A sensing system in accordance with claim 6 including:
   means responsive to said corrective electrical signals for reducing rotation of said vehicle about a rotative axis producing a velocity component image moving normal to any of the stripes constituting said reticles.

8. A sensing system in accordance with claim 7 in which said last-mentioned means includes:
   a plurality of orthogonally directed nozzles.

9. An optical rotation system for space vehicles comprising:
   a reticle having a plurality of parallel opaque and transparent stripes;

means for shifting said reticle in a direction transverse to said stripes so that when a stellar image is traversing said reticle in one direction said reticle will be shifted in said one direction and when a stellar image is traversing said reticle in an opposite direction said reticle will be shifted in a direction opposite to image movement;

photocell means responsive to light passing through said transparent stripes for producing an electrical signal in accordance with the amount of said light, means controlled by said electrical signal for operating said shifting means in said one direction in accordance with the magnitude of said electrical signal;

means for returning said reticle to its rest position when there is an insufficient amount of light striking said photocell, and means responsive to the resulting waveform of said signal for producing a control signal indicative of the direction said stellar image is advancing across said reticle.

10. An optical system in accordance with claim 9 in which:

said shifting means includes an electrodynamic device having a coil energized by said electrical signal, and said returning means includes a pair of leaf springs attached to said reticle at one end and fixedly anchored at their other ends.

11. An optical rotation sensing system for a space vehicle, said system being responsive to relative movement between a stellar image and said space vehicle, which comprises:

a space vehicle;

reticle means fixedly mounted on said vehicle so as to be movable therewith;

said reticle means having a plurality of optically distinguishable parallel stripes comprising a coded pattern, said relative movement causing said stellar image to traverse said reticle means so that said stripes alternately pass and block light from said stellar image; and means responsive to said light passed by said stripes upon movement of said stellar image across said reticle for producing a coded electrical signal indicative of the speed and direction of movement of said stellar image across said reticle to indicate the rotation of the space vehicle.

12. A sensing system in accordance with claim 11 in which:

said parallel stripes constitute an unsymmetrical pattern so that said light is passed by said stripes according to said pattern, and said responsive means detects said pattern of light passed by said stripes and renders said coded electrical signal indicative of the direction of stellar image movement across said reticle.

13. An optical rotation sensing system for space vehicles comprising:

a space vehicle, telescope means fixedly mounted on said vehicle so as to be movable therewith, a reticle fixedly mounted to said space vehicle adjacent to said telescope means and being composed of optically distinguishable parallel stripes constituting a coded pattern for passing and blocking light from a stellar image traversing said reticle, detecting means responsive to the movement of said stellar image across said reticle for producing a coded electrical signal in accordance with the velocity component of said image that is normal to the direction of said stripes, said coded electrical signal being indicative of the speed and direction of movement of said velocity component across said reticle, and means controlled by said coded electrical signal produced by said detecting means for adjusting the attitude of said space vehicle in a direction to reduce the speed of movement of said stellar image across said reticle.

14. An optical system for determining the direction of movement of a space vehicle in response to relative movement between a stellar image and said space vehicle, which comprises:

a reticle having a plurality of alternate opaque and transparent stripes for alternately blocking and passing light of said stellar image during a traverse thereof across said stripes in a selected path and in an unknown direction to be sensed;

means for releasably urging said reticle into a given rest position;

means for moving said reticle out of said rest position in a selected direction substantially parallel to said path of traverse of said stellar image;

means responsive to light of said stellar image passing through one of said transparent stripes for producing an output signal proportional to the amount of said light passed;

means responsive to said output signal for operating said moving means to move said reticle in said selected direction so that the amount of said light passed through said reticle is varied according to the direction of said traverse of said stellar image across said reticle;

said light responsive means being responsive to said varied amount of light for modulating said output signal; and means responsive to said modulated output signal for indicating the direction of said traverse to determine the direction of movement of said space vehicle.

15. A sensing system in accordance with claim 12 in which:

certain of said stripes are opaque, certain are transparent and certain are translucent for the purpose of providing said unsymmetrical pattern.

References Cited

UNITED STATES PATENTS

| | | | |
|---|---|---|---|
| 2,462,925 | 3/1949 | Varian | 250—203 X |
| 2,700,318 | 1/1955 | Snyder | 250—203 X |
| 2,981,843 | 4/1961 | Hansen | 250—203 |
| 3,001,289 | 9/1961 | Carbonara | 250—203 X |
| 3,037,121 | 5/1962 | Collision | 250—203 |
| 3,087,373 | 4/1963 | Poor et al. | 250—203 X |
| 3,090,583 | 5/1963 | Behun et al. | 250—203 X |
| 3,127,516 | 3/1964 | Ammerman et al. | 250—203 |

RALPH G. NILSON, *Primary Examiner.*

E. STRICKLAND, M. ABRAMSON,
*Assistant Examiners.*